Nov. 5, 1929.  D. F. PRISER  1,734,828
WATER HEATER
Filed Dec. 15, 1928
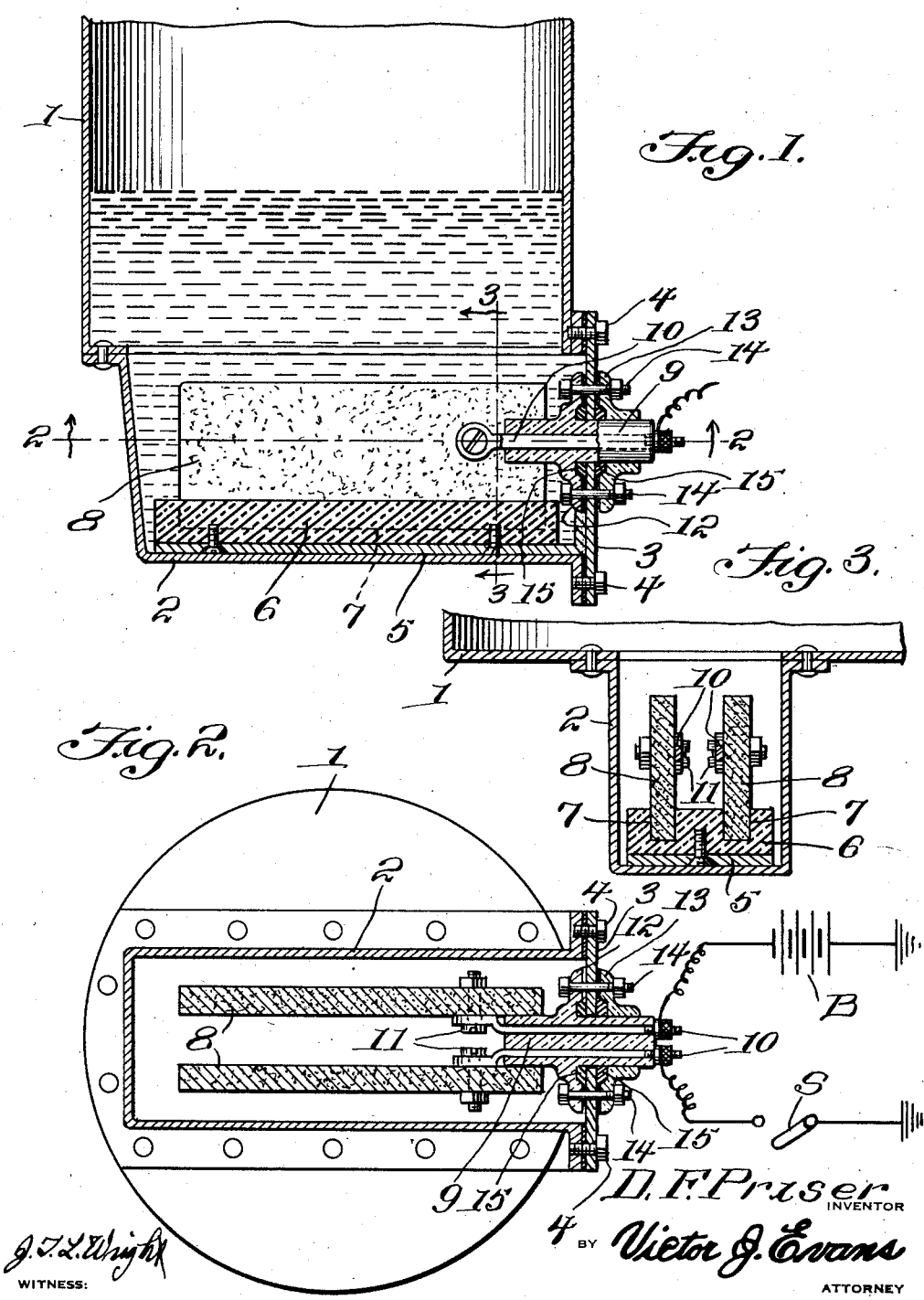
D. F. Priser
INVENTOR
BY Victor J. Evans
ATTORNEY
WITNESS:

Patented Nov. 5, 1929

1,734,828

UNITED STATES PATENT OFFICE

DAVID F. PRISER, OF NORTH MANCHESTER, INDIANA

WATER HEATER

Application filed December 15, 1928. Serial No. 326,396.

This invention relates to means for heating water and other liquids, the general object of the invention being to form a chamber in the bottom of the boiler or other container in which is placed a pair of members formed of carbon or the like and which are insulated from the walls of the chamber, but which are immersed in the water which enters the chamber from the container, with means for supplying current to the members whereby the current in passing from one member to the other, will pass through the water and thus heat the same. This arrangement prevents damage to the parts through the boiler becoming dry, for as soon as the members are uncovered, current will cease to flow.

Another object of the invention is to make the supporting means for the two members and their associated parts in the form of a drawer which can be readily removed from the chamber, after the fastening means, which connects the drawer with the walls of the chamber, are removed, so that the parts can be readily removed for repair or other purposes.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a sectional view through the lower part of a boiler and the chamber at the bottom thereof, showing the invention in use.

Figure 2 is a section on line 2—2 of Figure 1.

Figure 3 is a section on line 3—3 of Figure 1.
In these views, the numeral 1 indicates a boiler or container and 2 indicates a casing connected with the bottom of the boiler and in communication therewith so that the water in the boiler will enter the casing. The front of the casing is open and a plate 3 covers said open front and is bolted or otherwise fastened in place, as shown at 4. A gasket should be placed between the plate and the walls around the opening to make a watertight joint. A horizontal plate 5 has its front end connected with the plate 3 so that the plates 3 and 5 form a drawer-like member which slides in and out of the casing. A block 6 of non-conducting material is fastened to the upper face of the plate 5 and the upper face of said block is formed with the parallel grooves 7 for receiving the lower edges of the members 8 which are formed of carbon or the like, it being seen that these members are in spaced relation and are insulated from the walls of the casing and from the plates.

The plate 3 is formed with an opening through which passes a member 9 of non-conducting material which is bored to receive the electrodes 10, the inner end of each of which is connected with a member 8, as shown at 11. A flange 12 is formed on the member 9 and engages the inner face of the plate 3 and a flange-like member 13 is slidably arranged on the outer part of the member 9 and engages the outer face of the plate 3 and these parts are fastened together and to the plate by the bolts 14. Thus the member 9 is attached to the plate and if the members 12 and 13 are not formed of non-conducting material, they should be insulated from the plate. Packing means 15 is placed between the flanges and the plate to make a watertight joint at this point. The outer ends of the electrodes 10 are suitably connected to a source of supply which is shown in Figure 2 as a battery B, the circuit containing a switch S.

Thus it will be seen that current passing to the members 8 through the conductors 10 will pass from one member to the other through the water and thus the water will be heated, but if the water should reach such a low level that it does not cover the members 8, the flow of current will cease and thus no damage will result to the parts. With this device, water can be heated to any degree and by placing a small quantity of water in the boiler, steam can be produced by the device. If a heavy current is used, it might be necessary to ground the boiler and casing.

By removing the bolts 4, the drawer-like part, including the members 8 and their associated parts, can be readily removed from the casing for repair or other purposes.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A heater of the class described comprising a container for the water to be heated, a casing connected with the bottom of the container and in communication therewith, one end of the casing being open, a drawer-like member slidably arranged in the casing with a part closing the opening, a pair of spaced members formed of carbon or the like carried by and insulated from the drawer-like member and means for connecting said members with a source of electrical supply whereby the current passing through the water from one member to the other will heat the water.

2. A heater of the class described comprising a container for the water to be heated, a casing connected with the bottom of the container and in communication therewith, one end of the casing being open, a drawer-like member slidably arranged in the casing with a part closing the opening, a block of non-conducting material carried by the drawer-like member and having grooves in its upper face, members of carbon or the like having their lower edges seated in said grooves, an insulator carried by the front part of the drawerlike member, electrodes passing through the insulator and connected with the carbon members, means for connecting the electrodes with a source of electrical supply and means for connecting the front of the drawer-like member in a water-tight manner to the front of the casing.

In testimony whereof I affix my signature.

DAVID F. PRISER.